(12) United States Patent
Koguchi et al.

(10) Patent No.: US 11,327,230 B2
(45) Date of Patent: May 10, 2022

(54) OPTICAL FIBER HOLDER

(71) Applicant: SUMITOMO ELECTRIC OPTIFRONTIER CO., LTD., Yokohama (JP)

(72) Inventors: Keitarou Koguchi, Yokohama (JP); Shinsuke Kurino, Yokohama (JP); Ryuichiro Sato, Yokohama (JP); Masataka Ishizuka, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 16/970,778

(22) PCT Filed: Feb. 5, 2019

(86) PCT No.: PCT/JP2019/003984
§ 371 (c)(1),
(2) Date: Aug. 18, 2020

(87) PCT Pub. No.: WO2019/163508
PCT Pub. Date: Aug. 29, 2019

(65) Prior Publication Data
US 2021/0096300 A1   Apr. 1, 2021

(30) Foreign Application Priority Data

Feb. 20, 2018   (JP) .............................. JP2018-027980

(51) Int. Cl.
*G02B 6/255*   (2006.01)

(52) U.S. Cl.
CPC ......... *G02B 6/2553* (2013.01); *G02B 6/2555* (2013.01)

(58) Field of Classification Search
CPC ............................ G02B 6/2553; G02B 6/2555
See application file for complete search history.

(56) References Cited

U.S. PATENT DOCUMENTS

| 4,818,067 A | 4/1989 | Maisenbacher et al. |
| 5,351,330 A | 9/1994 | Jongewaard |
| 10,429,587 B2* | 10/2019 | Wiley .................... F16M 11/18 |
| 2014/0241665 A1 | 8/2014 | Beresnev |

FOREIGN PATENT DOCUMENTS

| JP | S59-055720 U | 4/1984 |
| JP | S60-028717 U | 2/1985 |
| JP | S62-055214 U | 4/1987 |
| JP | S62-258412 A | 11/1987 |
| JP | H03-063043 A | 3/1991 |
| JP | H04-037907 U | 3/1992 |
| JP | H04-362607 A | 12/1992 |
| JP | 2003-107280 A | 4/2003 |
| JP | 2003-270484 A | 9/2003 |
| JP | 2014-102392 A | 6/2014 |

* cited by examiner

*Primary Examiner* — Omar R Rojas
(74) *Attorney, Agent, or Firm* — Oliff PLC

(57) ABSTRACT

An optical fiber holder for holding an optical fiber includes: a holder main body; and a groove part that is capable of holding a part of the held optical fiber. The optical fiber holder has an adjustment mechanism that is capable of adjusting a position of the groove part with respect to the holder main body in a state where the groove part is placed on the holder main body.

5 Claims, 4 Drawing Sheets

OPTICAL FIBER HOLDER

TECHNICAL FIELD

The present disclosure relates to an optical fiber holder. The application claims priority based on Japanese Application No. 2018-27980 filed on Feb. 20, 2018, and incorporates all contents described in the Japanese application.

BACKGROUND ART

Patent Literature 1 describes an optical fiber holder for holding the end of an optical cable in which an optical fiber is extended from a jacket.

CITATION LIST

Patent Literature

Patent Literature 1: JP-A-2014-102392

SUMMARY OF INVENTION

An optical fiber holder according to one aspect of the present disclosure is an optical fiber holder for holding an optical fiber, the optical fiber holder including
a holder main body, and
a groove part that is capable of holding a part of the held optical fiber, in which
the optical fiber holder has an adjustment mechanism that is capable of adjusting a position of the groove part with respect to the holder main body in a state where the groove part is placed on the holder main body.

TECHNICAL PROBLEM

Figure 1:
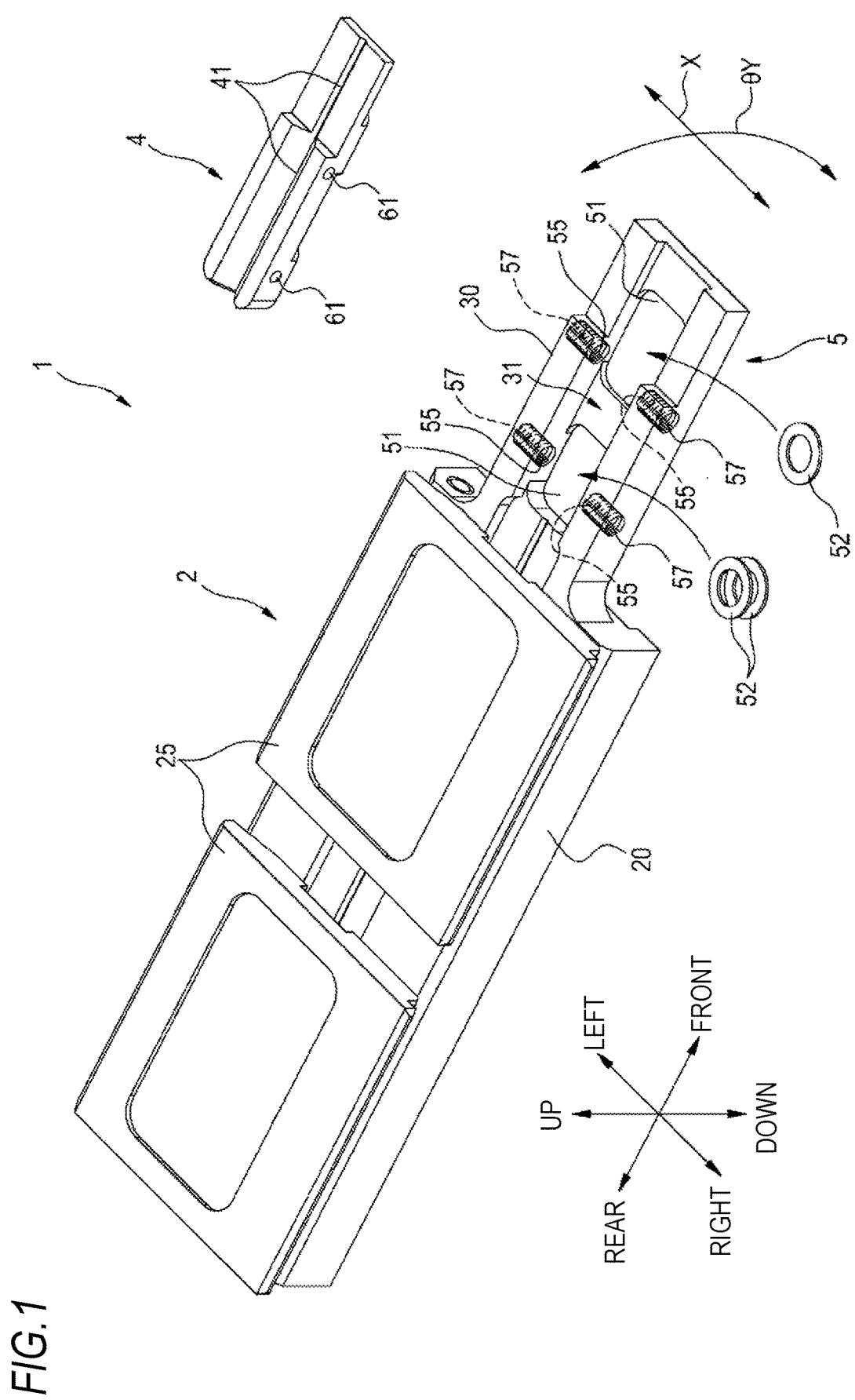
FIG. 1 is a perspective view illustrating an optical fiber holder according to an embodiment of the present disclosure.

For example, in a submarine cable or the like, the fusion of optical fibers is required to have high strength in order to obtain high precision and high reliability. To perform fusion with high precision, it is necessary to prevent the inclination and displacement of the fused optical fibers. To increase the strength of the fused portion, it is important not to directly contact a glass fiber portion of the optical fiber with a clamp or the like. To dispose the optical fiber with high precision without directly touching the glass fiber, the optical fiber holder for holding the optical fiber needs to be manufactured with high precision. Therefore, at the time of the initial installation of the optical fiber, it is necessary to set the optical fiber in the optical fiber holder within a range of several tens of µm. It is necessary to perform processing for releasing the stress (strain or the like) of the material of the optical fiber holder, which increases the manufacturing cost of the optical fiber holder.

Therefore, an object of the present disclosure is to provide an optical fiber holder capable of positioning and holding an optical fiber with high precision while reducing manufacturing cost.

Advantageous Effects of Invention

According to the present disclosure, it is possible to provide an optical fiber holder capable of positioning and holding an optical fiber with high precision while reducing manufacturing cost.

Description of Embodiment of Present Disclosure

First, an embodiment of the present disclosure will be described with reference to an example. An optical fiber holder according to one aspect of the present disclosure is
(1) an optical fiber holder for holding an optical fiber, the optical fiber holder including
a holder main body, and
a groove part that is capable of holding a part of the held optical fiber, in which
the optical fiber holder has an adjustment mechanism that is capable of adjusting a position of the groove part with respect to the holder main body in a state where the groove part is placed on the holder main body.

According to the above configuration, since it is possible to adjust the groove part as a separate component with respect to the position with respect to the holder main body, it is not necessary to increase the precision of each component by precision processing, or the like and it is possible to prevent an increase in the manufacturing cost of the optical fiber holder. It is possible to position and hold the optical fiber with high precision by adjusting the position of the optical fiber to be held by the adjusting mechanism.

(2) For the position of the groove part with respect to the holder main body, the adjustment mechanism may be capable of adjusting the position of the groove part in a height direction orthogonal to an axial direction and a width direction and an inclination angle with the width direction as a central axis.

According to the above configuration, for the position of the groove part with respect to the holder main body, it is possible to adjust the position in the height direction and the inclination angle with the width direction as the central axes.

(3) For the position of the groove part with respect to the holder main body, the adjustment mechanism may be capable of adjusting the position of the groove part in a width direction orthogonal to an axial direction and a height direction and an inclination angle with the height direction as a central axis.

According to the above configuration, for the position of the groove part with respect to the holder main body, it is possible to adjust the position in the width direction and the inclination angle with the height direction as the central axes.

(4) The adjustment mechanism may be capable of adjusting a position in the height direction and an inclination angle with the width direction as a central axis by providing an area where a shim is installable between a lower part of the groove part and the holder main body and installing the shim in the area.

According to the above configuration, since an area where a shim can be installed is provided between the lower part of the groove part and the holder main body, it is possible to adjust the position in the height direction and the inclination angle with the width direction as the central axis with a simple configuration in which the shim is installed in the area.

(5) The adjustment mechanism may include
a female screw provided in at least three places on a side part of the holder main body facing the groove part in a state where the groove part is placed on the holder main body, and
a male screw screwed to the female screw, and
the position in the width direction and the inclination angle with the height direction as a central axis may be adjusted by adjusting tightening by the male screw.

According to the above configuration, it is possible to adjust the position in the width direction and the inclination angle with the height direction as the central axis with a simple structure in which the tightening by the male screw is adjusted.

(6) A fixing mechanism capable of fixing the groove part to the holder main body may be included.

According to the above configuration, the position and inclination of the optical fiber adjusted by the adjustment mechanism can be maintained by the fixing mechanism.

(7) The fixing mechanism includes
a female screw provided in at least three places on a side part of the holder main body facing the groove part in a state where the groove part is placed on the holder main body,
a male screw screwed to the female screw, and
a recessed part provided in a portion of the groove part, the portion facing the female screw, in which
the recessed part may be at a height position such that a position of an apex of a tip of the male screw is between a lower end of the recessed part and a central part, and the tip of the male screw may be configured to abut the recessed part by tightening the male screw, and the groove part may be configured to be pressed toward a bottom surface of the holder main body.

According to the above configuration, it is possible to realize a fixing mechanism by using a female screw and a male screw that also have the function of an adjustment mechanism and a recessed part provided in a portion facing the female screw, and with such configuration, it is possible to maintain the adjusted position and inclination of the optical fiber. Therefore, it is possible to realize a fixing mechanism that has also a function of an adjustment mechanism with a simple configuration, thereby reducing the manufacturing cost.

DESCRIPTION OF EMBODIMENTS

Specific examples of an optical fiber holder according to an embodiment of the present disclosure will be described with reference to drawings. The present invention is not limited to these examples, but is defined by the scope of the claims, and is intended to include meanings equivalent to the scope of the claims and all modifications within the scope.

FIG. 1 is a perspective view illustrating an example of an optical fiber holder according to an embodiment of the present disclosure. The optical fiber holder holds the end of an optical fiber during the fusion processing of the optical fiber used in, for example, a submarine cable. As illustrated in FIG. 1, an optical fiber holder 1 includes a holder main body 2 and a groove part 4 placed on the holder main body 2. Hereinafter, in the drawings, the front-rear direction of the optical fiber holder 1 will be described as "axial direction", the left-right direction as "width direction", and the up-down direction as "height direction".

The holder main body 2 includes a main body 20, a lid 25 that can cover the upper surface of the main body 20, and a groove part placing table 30 that extends from the front end of the main body 20 in the axial direction. The groove part 4 includes a groove 41 capable of accommodating the optical fiber.

The main body 20 and the groove part placing table 30 in the holder main body 2 are integrally formed. The main body 20 and the groove part placing table 30 are made of, for example, aluminum. The groove part placing table 30 is formed with a groove part accommodating recessed part 31 capable of accommodating the groove 4 along the axial direction.

Figure 2:
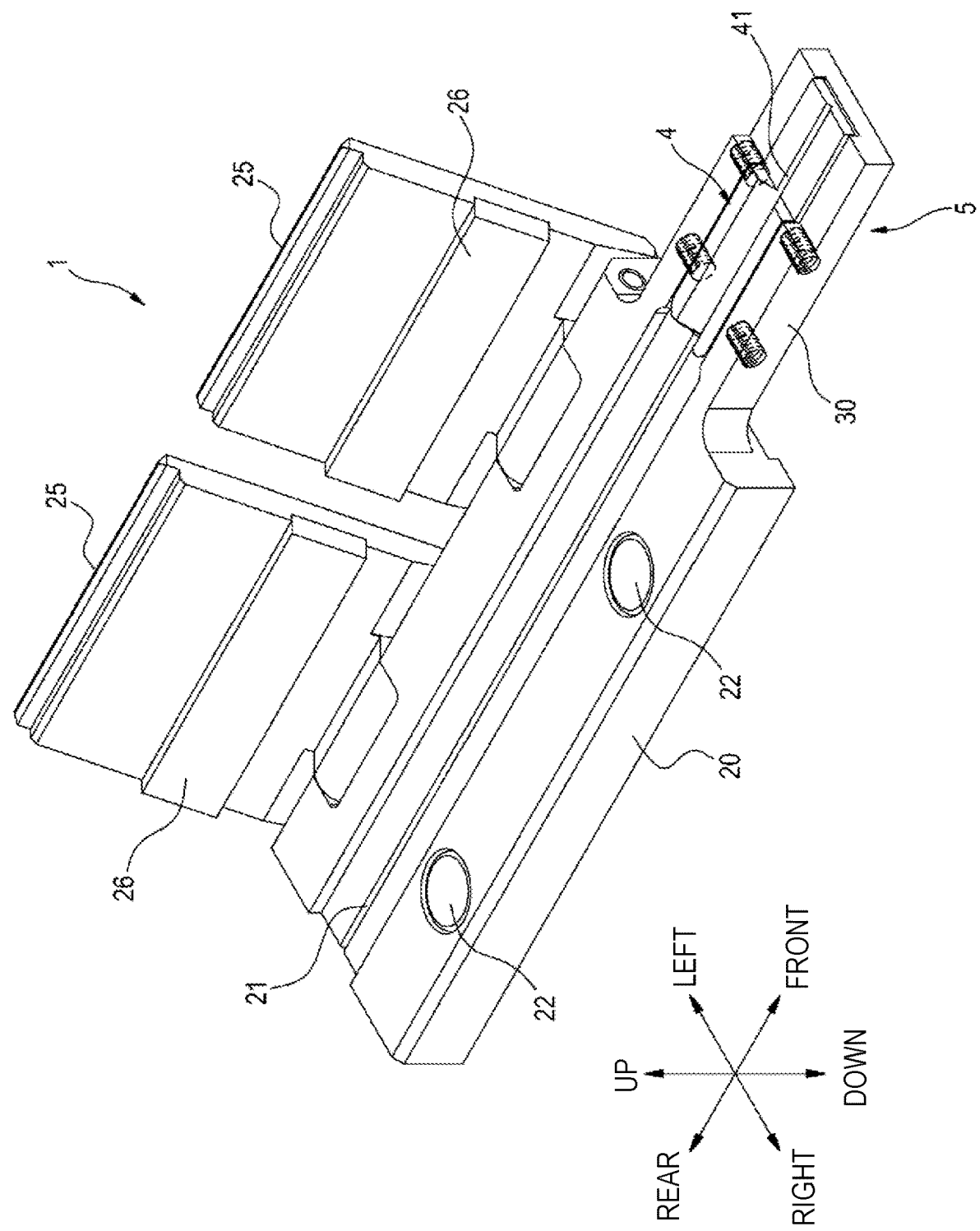
FIG. 2 is a perspective view illustrating a state where a lid of a holder main body is opened.

FIG. 2 illustrates the optical fiber holder 1 in a state where the groove part 4 is accommodated in the groove part accommodating recessed part 31 of the groove part placing table 30 and the lid 25 of the holder main body 2 is opened. A fiber accommodating groove 21 capable of accommodating an optical fiber is formed in the central part of the main body 20 along the axial direction. The groove part 4 accommodated in the groove part accommodating recessed part 31 is positioned to come into contact with the end of the central part of the main body 20. The groove 41 formed in the groove part 4 extends in the central part of the groove part 4 in the axial direction to be continuous with the fiber accommodating groove 21 of the main body 20.

Two lids 25 are attached to one side part of the main body 20 side by side in the front-rear direction. The lid 25 is rotatably connected to the main body 20. By rotating the lid 25, the upper surface of the main body 20 is opened and closed. The lid 25 is disposed to cover the upper part of the fiber accommodating groove 21 by being rotated toward the upper surface of the main body 20. The lid 25 is provided with a holding plate part 26 made of an elastic material such as rubber on the surface facing the main body 20. By rotating the lid 25 toward the upper surface side of the main body 20, the holding plate part 26 is disposed above the fiber accommodating groove 21.

A magnet 22 is provided on the upper surface of the main body 20 on the side part opposite to the one side part to which the lid 25 is connected. The lid 25 is made of a magnetic material such as iron. Therefore, the lid 25 is attracted by the magnetic force of the magnet 22 in a state of being placed on the upper surface of the main body 20. As a result, the optical fiber accommodated in the fiber accommodating groove 21 is held by the holding plate part 26 of the lid 25.

Figure 3:
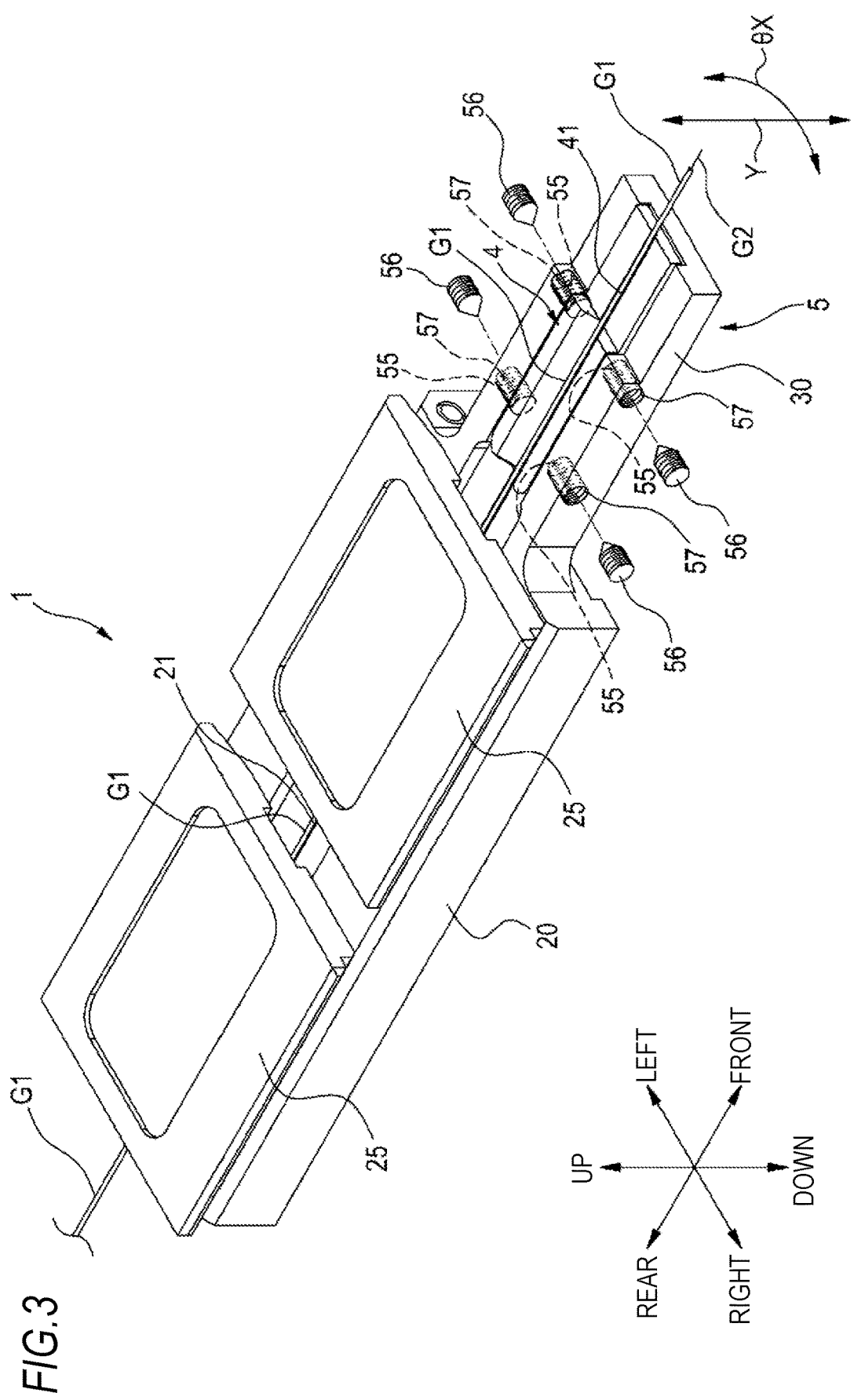
FIG. 3 is a perspective view illustrating the optical fiber holder holding an optical fiber.

FIG. 3 illustrates the optical fiber holder 1 in a state where an optical fiber G1 is accommodated in the fiber accommodating groove 21 of the main body 20 and the groove 41 of the groove part 4 and the lid 25 of the main body 20 is closed. The optical fiber G1 accommodated in the groove is, for example, an optical fiber coated around a glass fiber. The coating is stripped from the tip of the optical fiber G1 to expose a glass fiber G2. The exposed portion of the glass fiber G2 is held in a state of protruding from the groove 41 of the groove part 4 to the outside of the optical fiber holder 1. The processing of stripping the coating from the tip of the optical fiber G1 may be performed before the optical fiber G1 is held in the optical fiber holder 1, or may also be performed in a state where the optical fiber G1 is held in the optical fiber holder 1.

The optical fiber has, for example, a coating diameter of about 250 μm, a glass diameter of about 125 μm, and a core diameter of about 10 μm. The optical fiber may have a coating diameter of about 500 μm or 900 μm. In that case, the fiber accommodating groove 21 of the main body 20 and the groove 41 of the groove part 4 are formed in a size corresponding to the diameter of the optical fiber to be accommodated.

As illustrated in FIGS. 1 to 3, the optical fiber holder 1 includes an adjustment mechanism 5 capable of adjusting the position of the groove part 4 with respect to the groove part placing table 30 in a state where the groove part 4 is placed on the groove part placing table 30 of the holder main body 2.

As illustrated in FIG. 1, the adjustment mechanism 5 includes a recessed area 51 provided at the bottom of the groove part accommodating recessed part 31 formed in the groove part placing table 30. The recessed area 51 is provided between the lower part of the groove part 4 and the groove part placing table 30 when the groove part 4 is placed on the groove part placing table 30. In the example, one recessed area 51 is provided in each of the front part and the rear part of the groove part accommodating recessed part 31. In the recessed area 51, for example, a thin annular shim 52 is installed. The thickness of the shim 52 is about several μm to several tens of μm. The shim 52 is formed of, for example, stainless steel or the like. The shape of the shim 52 is not limited to the annular shape.

By installing the shim 52 in the recessed area 51, the position of the groove part 4 with respect to the groove part placing table 30 is adjusted in the height direction (up-down direction) orthogonal to the axial direction (front-rear direction) and the width direction (left-right direction) of the groove part 4.

The position adjustment in the height direction includes the position adjustment by moving the entire groove part 4 in the height direction by a predetermined distance. In the adjustment, for example, by installing the shims 52 having the same thickness in the front and rear recessed areas 51, the entire position of the groove part 4 is moved in the height direction by the same distance.

The adjustment of the position in the height direction includes the position adjustment by inclining the groove part 4 by moving the front side and the rear side of the groove part 4 by different distances in the height direction. In the adjustment, for example, by increasing the thickness of the shim 52 installed in one of the recessed area 51, an inclination angle θY of the groove part 4 with the width direction as a central axis X illustrated in FIG. 1 is adjusted to move the position of the groove part 4 in the height direction by different distances on the front side and the rear side.

As illustrated in FIG. 3 or FIG. 1, the adjustment mechanism 5 includes a female screw 55 provided on the left and right side parts of the groove part placing table 30, and a male screw 56 screwed to the female screw 55. The left and right side parts of the groove part placing table 30 mean the side parts of the groove part placing table 30 facing the groove part 4 in a state where when the groove part 4 is placed on the groove part placing table 30.

The female screws 55 formed by cutting grooves inside mounting holes 57 are provided on the left and right side parts of the groove part placing table 30. In the example, two female screws 55 are provided on each of the front and rear parts of the left and right side parts. Each male screw 56 is screwed into the female screw 55 of the mounting hole 57.

The male screw 56 is screwed into the female screw 55 and the male screw 56 is pushed in to tighten the groove part 4 with the male screw, and for the position of the groove part 4 with respect to the groove part placing table 30, the position of the groove part 4 in the width direction (horizontal direction) orthogonal to the axial direction (front-rear direction) and the height direction (up-down direction) is adjusted.

The position adjustment in the width direction includes the position adjustment by moving the entire groove part 4 in the width direction by a predetermined distance. In the adjustment, for example, the two male screws 56 screwed into the front part and the rear part of the side part are pushed in by the same distance, thereby moving the position of the entire groove part 4 by a predetermined distance in the width direction.

The adjustment of the position in the width direction includes the position adjustment by inclining the groove part 4 by moving the front side and the rear side of the groove part 4 by different distances in the width direction. In the adjustment, for example, by increasing the pushing distance of one male screw 56 of the two front and rear male screws 56, an inclination angle θX of the groove part 4 with the height direction as a central axis Y illustrated in FIG. 3 is adjusted to move the position of the groove part 4 in the width direction by different distances on the front side and the rear side.

Figure 4:
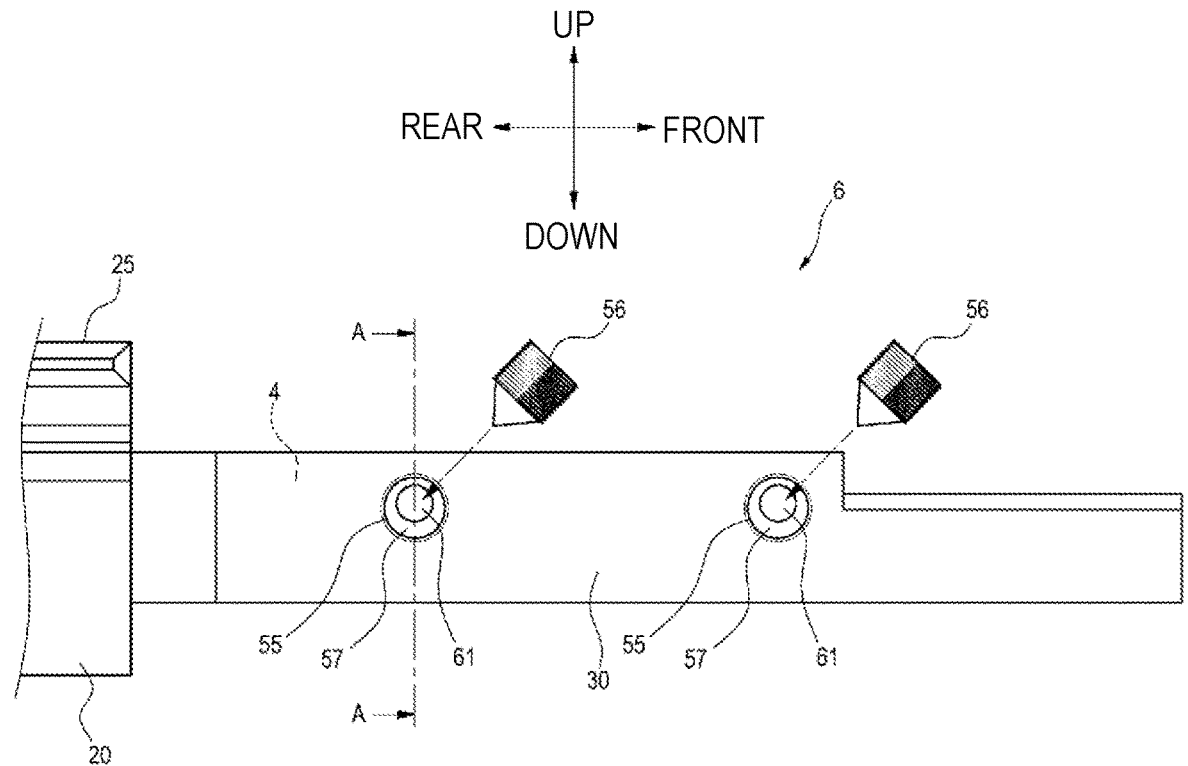
FIG. 4 is a side view illustrating a groove part placing table of the holder main body.
Figure 5:
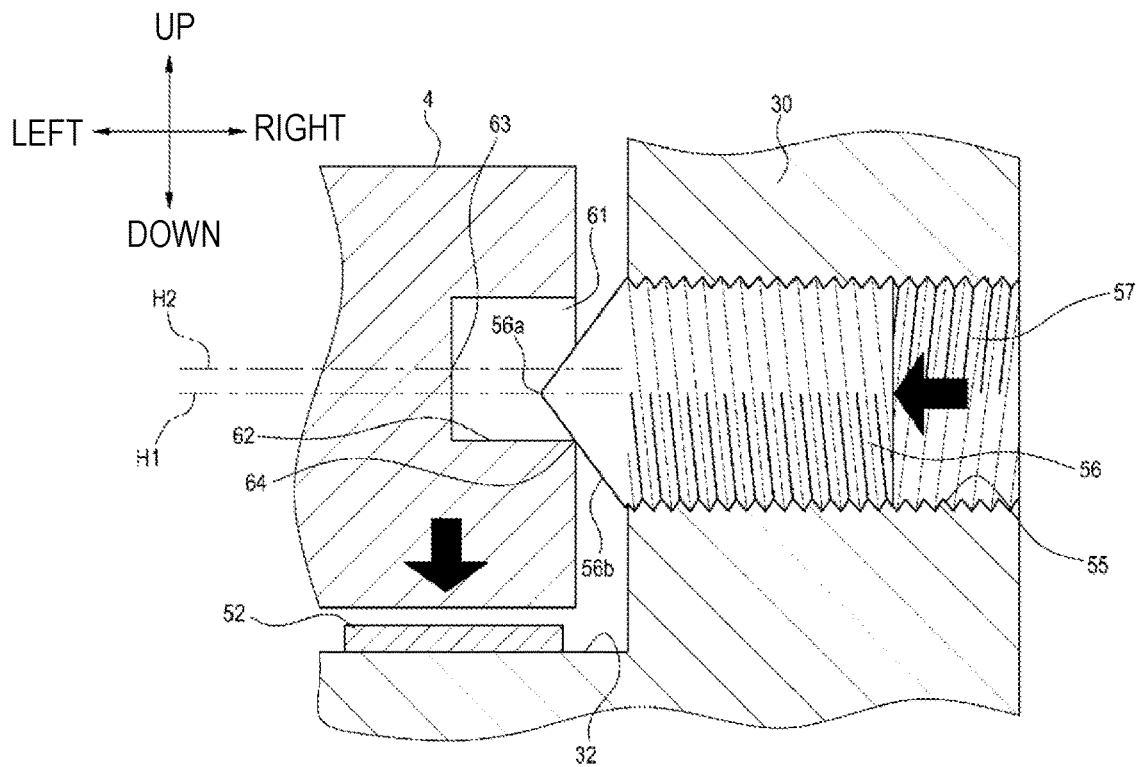
FIG. 5 is a cross-sectional view taken along the line A-A in FIG. 4.

FIG. 4 illustrates a right side view of the groove part placing table 30 in the holder main body 2. The groove part 4 is placed in the groove part accommodating recessed part 31 of the groove part placing table 30. FIG. 5 is a cross-sectional view taken along the line A-A of FIG. 4. As illustrated in FIGS. 4 and 5, the optical fiber holder 1 includes a fixing mechanism 6 capable of fixing the groove part 4 placed in the groove part accommodating recessed part 31 to the groove part placing table 30.

The fixing mechanism 6 includes the female screw 55 provided in the mounting holes 57 formed on the left and right side parts of the groove part placing table 30, the male screw 56 screwed into the female screw 55, and a fixing recessed part 61 provided in the groove part 4. The female screw 55 and the male screw 56 of the fixing mechanism 6 are members common to the female screw 55 and the male screw 56 of the adjustment mechanism 5. In the example, the female screw 55 and the male screw 56 are configured to also function as the fixing mechanism 6 for fixing the groove part 4. Two fixing recessed parts 61 are provided on the outer surfaces of the left and right side parts of the groove part 4 side by side in the front-rear direction (see FIG. 1).

As illustrated in FIG. 4, the fixed recessed part 61 is provided at the side part of the groove part 4 at a position facing the female screw 55 of the mounting hole 57 formed in the groove part placing table 30. The fixing recessed part 61 is formed, for example, in a cylindrical shape, and is provided such that the distance between the center points of the two fixing recessed parts 61 is the same as the distance between the center points of the two female screws 55.

As illustrated in FIGS. 4 and 5, the fixing recessed pat 61 is provided so that the position of the center point thereof is displaced upward from the position of the center point of the female screw 55. The fixing recessed part 61 is provided at a height H1 such that the position of an apex 56a at the tip of the male screw 56 is between a lower end 62 of the fixing recessed part 61 and a height H2 of a central part 63. By tightening the male screw 56, a lower inclined part 56b of the tip of the male screw 56 is configured to abut a lower end corner 64 of the fixing recessed part 61, press the groove part 4 toward a bottom surface 32 of the groove part placing table 30, and fixe the groove part 4 to the groove part placing table 30. The radius of the male screw 56 is preferably 500 μm or more, for example. Even when the shim 52 (several μm to several tens of μm) is installed in the recessed area 51 of the groove part placing table 30 and the position of the groove part 4 moves upward or downward, the lower inclined part 56b of the male screw 56 is configured to abut the lower end corner 64 of the fixed recessed part 61.

For example, in order to fuse the optical fibers held in the optical fiber holder with high precision, it is necessary to prevent the inclination and displacement of the optical fibers to be fused, and in order to dispose the optical fibers with high precision, it is necessary to improve the precision of each component by performing precise processing or the like. On the other hand, according to the optical fiber holder 1 according to the present embodiment as described above, it is possible to adjust the position of the groove part 4 with respect to the holder main body 2 by placing the groove part 4 provided as a component separate from the holder main body 2 on the groove part placing table 30 of the holder main body 2. Therefore, in the optical fiber holder 1 according to the present embodiment, it is not necessary to increase the precision of each component by precise processing or the like, and an increase in manufacturing cost can be prevented.

The optical fiber holder 1 according to the present embodiment includes the adjustment mechanism 5. With the adjustment mechanism 5, for the position of the groove part 4 in the height direction with respect to the holder main body 2, it is possible to adjust not only the height of the entire groove part 4 but also the inclination angle θY with the width direction of the groove part 4 as the central axis by placing the shim 52 between the groove part placing table 30 and the groove part 4. For the position of the groove part 4 in the width direction with respect to the holder main body 2, it is possible to adjust not only the entire groove part 4 in the width direction but also the inclination angle θX with the height direction of the groove part 4 as the central axis by pressing the groove part 4 by tightening the male screw 56. Therefore, the held optical fiber G1 can be positioned with high precision by adjusting each adjusting member as needed.

In the optical fiber holder 1 according to the present embodiment, the recessed area 51 in which the shim 52 can be installed is provided between the lower part of the groove part 4 and the groove part placing table 30. Therefore, it possible to easily adjust the position of the groove part 4 in the height direction with respect to the holder main body 2 with a simple configuration in which the shim 52 is installed in the recessed area 51.

In the optical fiber holder 1 according to the present embodiment, the female screw 55 and the male screw 56 for position adjustment are provided on the side part of the groove part placing table 30. Therefore, it possible to easily adjust the position of the groove part 4 in the width direction with respect to the holder main body 2 with a simple configuration in which the tightening by the male screw 56 is adjusted.

The optical fiber holder 1 according to the present embodiment includes the fixing mechanism 6, and the fixing mechanism 6 can fix the groove part 4 to the groove part placing table 30 of the holder main body 2. Therefore, the position and inclination of the optical fiber G1 adjusted by the adjusting mechanism 5 can be maintained by the fixing mechanism 6. The fixing mechanism 6 can be realized by using the female screw 55 and the male screw 56 that also have the function of the adjustment mechanism 5, and the fixing recessed part 61 provided in a portion facing the female screw 55. Therefore, the fixing mechanism 6 having the function of the adjustment mechanism 5 can be realized with a simple configuration, and the manufacturing cost can be reduced.

While the present disclosure has been described in detail and with reference to a particular embodiment, it will be apparent to those skilled in the art that various changes and modifications can be made without departing from the spirit and scope of the disclosure. The number, positions, shapes, and the like of the constituent members described above are not limited to those in the above embodiment, and can be changed to the number, positions, shapes, and the like suitable for implementing the present disclosure.

In the example of the above-described embodiment, the groove part placing table 30 is provided with the two recessed areas 51, but the number is not limited thereto. For example, three or more or only one recessed area 51 may be provided. In addition, the height direction of the groove part 4 is adjusted by the recessed area 51 and the shim 52, but the present invention is not limited thereto. For example, the height direction may be adjusted by screwing a male screw into a female screw provided at the two front and rear places of the lower part of the groove part placing table 30 and tightening the male screw to push up the groove part 4.

In the example of the above-described embodiment, the adjustment of the groove part 4 in the width direction is performed by two female screws 55 and two male screws 56 on each of the left and right side parts of the groove part placing table 30, at four places in total, the present invention is not limited thereto. The female screw 55 and the male screw 56 may be provided at, at least three places in total. For example, two places may be provided on one side part and one place may be provided on the other side part. In such a case, two places may be provided on one side part in the front part and the rear part, and one place may be provided on the other side part in the center part which is an intermediate part thereof.

In the example of the above embodiment, some members of the fixing mechanism 6 are shared as some members of the adjustment mechanism 5, but the present invention is not limited thereto. The fixing mechanism 6 may be configured to fix the groove part 4 by using a member different from the member of the adjustment mechanism 5.

REFERENCE SIGNS LIST

1: optical fiber holder
2: holder main body
4: groove part
5: adjustment mechanism
6: fixing mechanism
20: main body
21: fiber accommodating groove
25: lid
30: groove part placing table
31: groove part accommodating recessed part
41: groove
51: recessed area
52: shim
55: female screw
56: male screw
57: mounting hole
61: fixed recessed part
56a: apex
62: lower end
63: central part
G1: optical fiber
G2: glass fiber

The invention claimed is:

1. An optical fiber holder for holding an optical fiber, the optical fiber holder comprising:

a holder main body;
a groove part that is configured to hold a part of the held optical fiber; and
a fixing mechanism that is configured to fix the groove part to the holder main body, wherein
the optical fiber holder has an adjustment mechanism that is configured to adjust a position of the groove part with respect to the holder main body in a state where the groove part is placed on the holder main body, and
the fixing mechanism includes
   a female screw provided in at least three places on a side part of the holder main body facing the groove part in the state where the groove part is placed on the holder main body,
   a male screw screwed into the female screw, and
   a recessed part provided in a portion of the groove part, the portion facing the female screw, and
the recessed part is at a height position such that a position of an apex of a tip of the male screw is between a lower end of the recessed part and a central part, the tip of the male screw is configured to abut the recessed part by tightening the male screw, and the groove part is configured to be pressed toward a bottom surface of the holder main body.

2. The optical fiber holder according to claim 1, wherein for the position of the groove part with respect to the holder main body, the adjustment mechanism is configured to adjust the position of the groove part in a height direction orthogonal to an axial direction and a width direction and an inclination angle with the width direction as a central axis.

3. The optical fiber holder according to claim 1, wherein for the position of the groove part with respect to the holder main body, the adjustment mechanism is configured to adjust the position of the groove part in a width direction orthogonal to an axial direction and a height direction and an inclination angle with the height direction as a central axis.

4. The optical fiber holder according to claim 2, wherein the adjustment mechanism includes (i) an area between a lower part of the groove part and the holder main body and (ii) a shim installed in the area.

5. The optical fiber holder according to claim 3, wherein the adjustment mechanism
is configured to adjust the position in the width direction and the inclination angle with the height direction as the central axis by adjusting a tightness of the male screw.

* * * * *